US005237345A

United States Patent [19]

Takanashi et al.

[11] Patent Number: 5,237,345

[45] Date of Patent: Aug. 17, 1993

[54] CHARGE LATENT IMAGE INFORMATION FORMING APPARATUS AND METHOD OF TRANSFERRING CHARGE LATENT IMAGE INFORMATION FROM FIRST RECORDING MEDIUM TO SECOND RECORDING MEDIUM

[75] Inventors: Itsuo Takanashi, Kamakura; Shintaro Nakagaki, Miura; Tsutou Asakura; Masato Furuya, both of Yokohama; Yuji Uchiyama, Chigasaki, all of Japan

[73] Assignee: Victor Company of Japan, Ltd., Yokohama, Japan

[21] Appl. No.: 718,670

[22] Filed: Jun. 21, 1991

[30] Foreign Application Priority Data

Jun. 22, 1990 [JP] Japan .................................. 2-165351
Jul. 6, 1990 [JP] Japan .................................. 2-179178
Mar. 28, 1991 [JP] Japan .................................. 3-899777

[51] Int. Cl.[5] .............................................. G01D 15/06

[52] U.S. Cl. ................................. 340/153.1; 346/160; 346/1.1; 358/209

[58] Field of Search .................. 346/135.1, 153.1, 108, 346/160, 1.1; 365/106, 112; 358/213.11, 213.13, 209; 359/255, 254, 253, 252, 251, 250, 249, 248, 246

[56] References Cited

U.S. PATENT DOCUMENTS 3,551,146 12/1970 Gundlach .......................... 346/153.1
3,653,890 4/1972 Seimiya ............................ 346/153.1
3,703,376 11/1972 Gundlach et al. ............... 346/153.1
3,890,040 6/1975 Schmidlin ........................... 355/212
3,965,476 6/1976 Wenander et al. .................. 346/1.1
4,410,614 10/1983 Lelental et al. ....................... 430/45
4,547,787 10/1985 Kaneko et al. ....................... 346/160
4,989,038 1/1991 Kobayashi et al. ................... 355/202

FOREIGN PATENT DOCUMENTS 168190 3/1989 Japan .
1190084 7/1989 Japan .
239062 2/1990 Japan .
325736 2/1991 Japan .
329964 2/1991 Japan .

OTHER PUBLICATIONS

"Transfer of Electrostatic Images and Its Applications" by M. Anzai; Electrophotography, vol. 11, No. 3, Sep. 1972; pp. 3-11.

*Primary Examiner*—George H. Miller, Jr.
*Assistant Examiner*—Randy W. Gibson
*Attorney, Agent, or Firm*—Lowe, Price, LeBlanc & Becker

[57] ABSTRACT

A charge image information transferring apparatus includes a recording member having a charge latent image; a photo-modulation member; a device for moving the recording member and the photo-modulation member relative to each other; and a device for transferring information, represented by the charge latent image. from the recording member to the photo-modulation member. An electric field of the charge latent image is applied to the photo-modulation member when a distance between the recording member and the photo-modulation member becomes equal to or smaller than a predetermined distance. The applied electric field has a magnitude which exceeds a threshold value with respect to a change in a condition of the photo-modulation member.

7 Claims, 9 Drawing Sheets

CHARGE LATENT IMAGE INFORMATION FORMING APPARATUS AND METHOD OF TRANSFERRING CHARGE LATENT IMAGE INFORMATION FROM FIRST RECORDING MEDIUM TO SECOND RECORDING MEDIUM

BACKGROUND OF THE INVENTION

1. Field of the Invention

This invention relates to an apparatus for transferring charge latent image information from a first recording medium to a second recording medium. This invention also relates to a method of transferring image information.

2. Description of the Background Art

Japanese published unexamined patent application 64-164590, having a publication number 3-29964 discloses a charge image information transferring apparatus which includes a first recording medium for holding a charge latent image representing recorded information. The first recording medium has a lamination of a charge holding layer and an electrode layer. The prior art apparatus of Japanese patent application 64-164590 also includes a second recording medium having a lamination of a photo-modulation layer and an electrode layer. During an information transferring process, the first recording medium and the second recording medium are relatively moved toward each other while the electrode layers of the first recording medium and the second recording medium are electrically connected. The charge latent image on the first recording medium generates an electric field which acts on the second recording medium. When the intensity of the electric field applied to the photo-modulation layer of the second recording medium exceeds a threshold level at which the light transmissivity of the photo-modulation layer starts to vary, the information represented by the charge latent image is transferred from the first recording medium to the photo-modulation layer of the second recording medium.

In the prior art apparatus of Japanese patent application 64-164590 during the information transferring process, as the distance between the first recording medium and the second recording medium increases, the resolution of the image information transferred to the second recording medium decreases. Accordingly, in order to attain a high resolution of the transferred image information, strict control of the distance between the first recording medium and the second recording medium is required.

SUMMARY OF THE INVENTION

It is an object of this invention to provide an improved charge image information transferring apparatus.

A first aspect of this invention provides a charge image information transferring apparatus comprising a recording member having a charge latent image; a photo-modulation member; means for moving the recording member and the photo-modulation member relative to each other; and means for transferring information, represented by the charge latent image, from the recording member to the photo-modulation member: the improvement comprising means for applying an electric field of the charge latent image to the photo-modulation member when a distance between the recording member and the photo-modulation member becomes equal to or smaller than a predetermined distance, the applied electric field having a magnitude which exceeds a threshold value with respect to a change in a condition of the photo-modulation member.

A second aspect of this invention provides a method comprising the steps of using a photoconductive member and a recording member; applying light to a part of the photoconductive member at a first position, and recording information represented by the light on the part of the photoconductive member; opposing the recording member to a second position on the photoconductive member, the second position differing from the first position; moving the information-recording part of the photoconductive member to the second position; and providing an electrical change to the recording member in response to the information recorded on the photoconductive member, and transferring the information from the photoconductive member to the recording member.

A third aspect of this invention provides an apparatus comprising a photoconductive member; a recording member; means for applying light to a part of the photoconductive member at a first position, and for recording information represented by the light on the part of the photoconductive member; means for opposing the recording member to a second position on the photoconductive member, the second position differing from the first position; means for moving the information-recorded part of the photoconductive member to the second position; and means for providing an electrical change to the recording member in response to the information recorded on the photoconductive member, and for transferring the information from the photoconductive member to the recording member.

BRIEF DESCRIPTION OF THE DRAWINGS

FIGS. 12, 12*a*, & 12*b* are diagrams of an image information transferring apparatus according to an embodiment of this invention.

DESCRIPTION OF THE PREFERRED EMBODIMENTS

Embodiment 1

Figure 1:
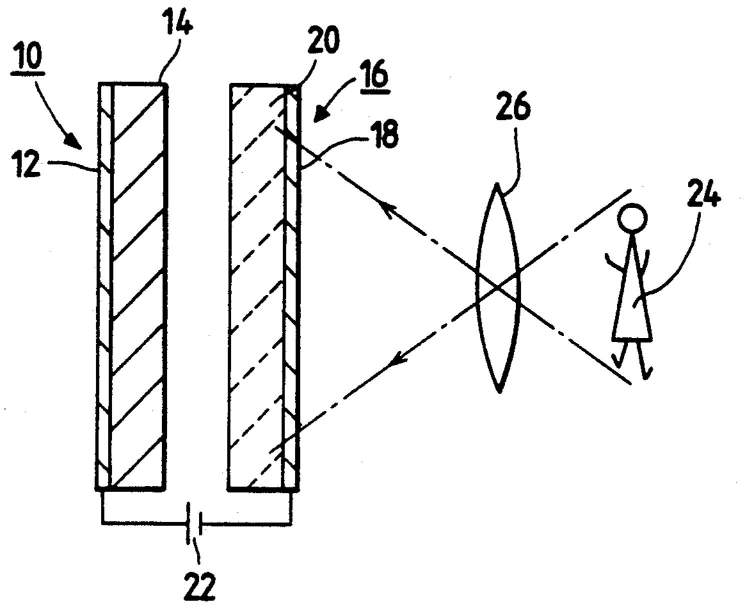
FIG. 1 is a diagram of a charge image forming apparatus.

With reference to FIG. 1, a first recording member 10 has a laminated structure of an electrode layer 12 and a charge holding layer 14. For example, the charge holding layer 14 is made of silicone resin having a high resistivity, or a resin layer having a surface portion containing high conductive particles. A charge latent image is formed on the first recording member 10 by a recording head 16. The recording head 16 has a laminated structure of an electrode layer 18 and a photoconductive layer 20. The photoconductive layer 20 opposes the charge holding layer 14. A dc power source 22 applies a drive voltage between the electrode layers 12 and 18.

A charge latent image is formed on the charge holding layer 14 as follows. In the case where an optical image of an object 24 is projected onto the photoconductive layer 20 via an optical system 26, the distribution of an impedance of the photoconductive layer 20 varies in accordance with the projected optical image. An aerial discharge occurs in a gap between the charge holding layer 14 and the photoconductive layer 20, so that a charge latent image corresponding to the optical image of the object 24 is formed on the charge holding layer 14.

Figure 2:
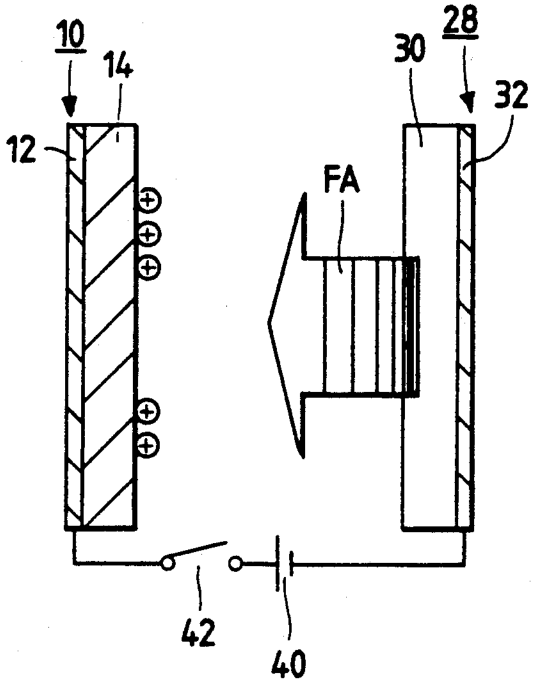
FIGS. 2 and 3 are diagrams of a charge image information transferring apparatus according to an embodiment of this invention.

The recorded information is transferred from the first recording member 10 to a second recording member as follows. As shown in FIG. 2, a second recording member 28 has a laminated structure of a photo-modulation layer 30 and an electrode layer 32. The photo-modulation layer 30 opposes the charge holding layer 14. The photo-modulation layer 30 is made of material having a memory effect. For example, the photo-modulation layer 30 is made of a composite film of liquid crystal and high-molecular material, or PLZT. The positive terminal of a dc power source 40 is connected to the electrode layer 12 via a switch 42. The negative terminal of the dc power source 40 is directly connected to the electrode layer 32. When the switch 42 is closed, a bias voltage is applied between the electrode layers 12 and 32 by the dc power source 40 so that a corresponding electric field is generated in a region between the electrode layers 12 and 32.

Figure 3:
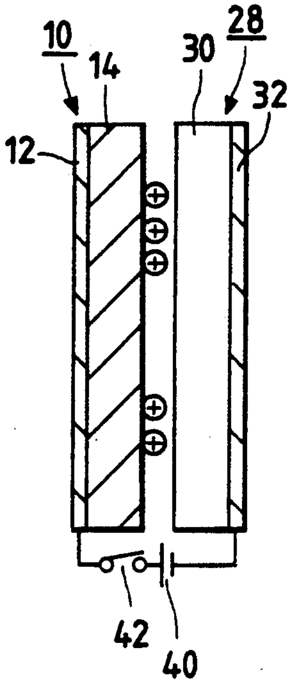

During an information transferring process, the second recording member 28 is manually moved toward the first recording member 10 while the switch 42 is held open. When the distance between the first recording member 10 and the second recording member 28 reaches a predetermined distance as shown in FIG. 3, the switch 42 is manually closed. In this case, the photo-modulation layer 30 is subjected to a resultant of an electric field caused by the charge latent image on the charge holding layer 14 and an electric field caused by the dc power source 42. The electric field caused by the dc power source 42 is predetermined so that the electric field will correspond to a threshold value of the photo-modulation layer 30 at which the light transmissivity of the photo-modulation layer 30 starts to vary. Therefore, the light transmissivity of the photo-modulation layer 30 accurately varies in response to the electric field caused by the charge latent image on the charge holding layer 14, and the recorded information is transferred from the charge holding layer 14 to the photo-modulation layer 30.

The predetermined distance between the first recording member 10 and the second recording member 28 at which the switch 42 is closed is chosen in dependence on a desired resolution of the image information recorded on the second recording member 28. For example, a resolution corresponding to 5 micrometers is desired, the predetermined distance between the first recording member 10 and the second recording member 28 is set to about 5 micrometers.

Embodiment 2

An embodiment 2 of this invention is similar to the embodiment 1 except for the following design changes. In the embodiment 2, the dc power source 40 is connected between the electrode layers 12 and 32 in a manner such that an electric field caused by the dc power source 40 will have a direction opposite to the direction of the electric field caused by the charge latent image on the charge holding layer 14.

While the second recording member 28 is moved toward the first recording member 10, the switch 42 remains closed so that the electric field caused by the charge latent image keeps cancelled by the electric field caused by the dc power source 40. When the distance between the first recording member 10 and the second recording member 28 reaches a predetermined distance, the switch 42 is manually opened so that the electric field caused by the dc power source 40 is removed. As a result, the photo-modulation layer 30 is directly subjected to the electric field caused by the charge latent image which has a level exceeding the threshold value of the photo-modulation layer 30. Thus, the recorded information is transferred from the first recording member 10 to the second recording member 28.

Embodiment 3

Figure 4:
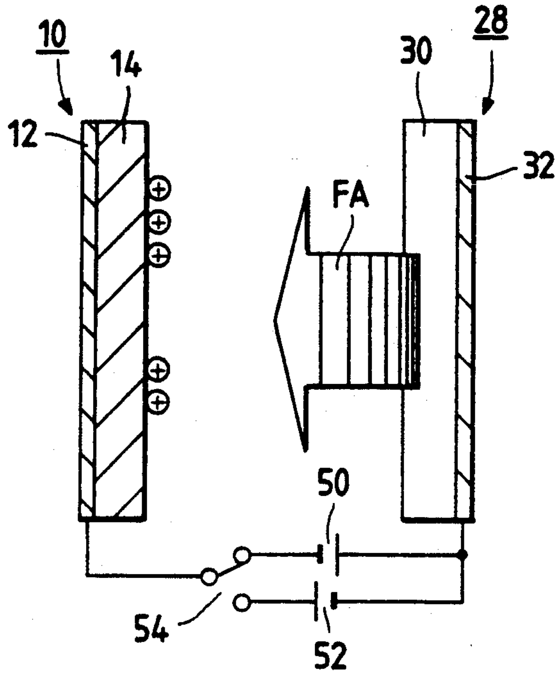
FIGS. 4 and 5 are diagrams of a charge image information transferring apparatus according to an embodiment of this invention.
Figure 5:
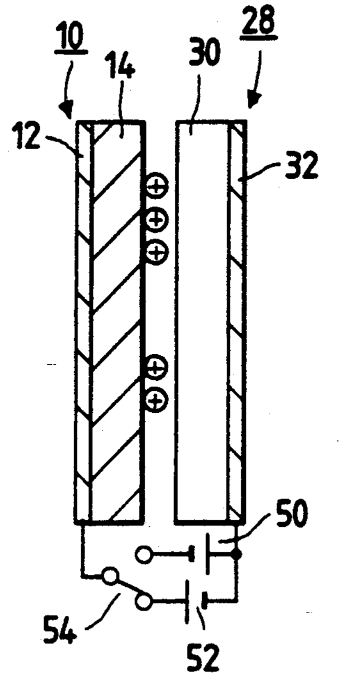

FIGS. 4 and 5 shows an embodiment 3 of this invention which is similar to the embodiment 1 except for the following design changes. As shown in FIGS. 4 and 5, the positive terminal of a dc power source 50 is connected to the electrode layer 32. The negative terminal of the dc power source 50 is connected to the electrode layer 12 via a switch 54. The negative terminal of a dc power source 52 is connected to the electrode layer 32. The positive terminal of the dc power source 52 is connected to the electrode layer 12 via the switch 54. The switch 54 serves to selectively connect the electrode layer 12 to one of the dc power sources 50 and 52.

While the second recording member 28 is moved toward the first recording member 10, the switch 54 is manually operated so that the electrode layer 12 remains connected to the dc power source 50. As a result, the electric field caused by the charge latent image keeps cancelled by the electric field caused by the dc power source 50. When the distance between the first recording member 10 and the second recording member 28 reaches a predetermined distance as shown in FIG. 5, the switch 54 is manually changed so that the electrode layer 12 is connected to the dc power source 52. As a result, the electric field caused by the dc power source 50 is removed, and instead the dc power source 52 causes an electric field having a direction equal to the direction of the electric field caused by the charge latent image. Thus, the photo-modulation layer 30 is subjected to the sum of the electric field caused by the dc power source 52 and the electric field caused by the charge latent image, and the electric field sum has a level which exceeds the threshold level of the photo-modulation layer 30. Therefore, the recorded information is transferred from the first recording member 10 to the second recording member 28.

Embodiment 4

Figure 6:
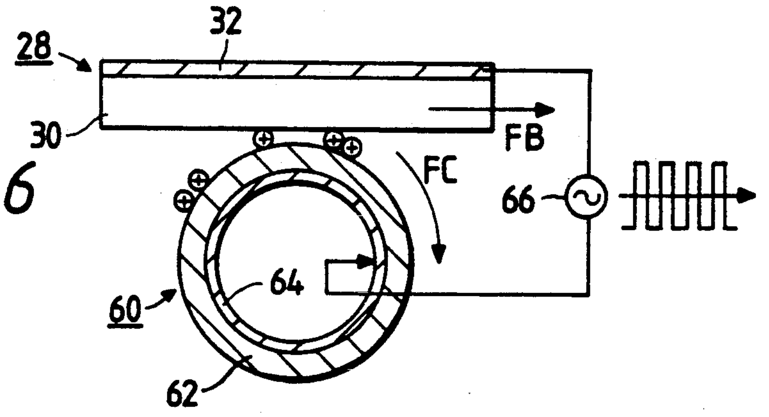
FIG. 6 is a diagram of a charge image information transferring apparatus according to an embodiment of this invention.

FIG. 6 shows an embodiment 4 of this invention which is similar to the embodiment 1 except for the following design changes. As shown in FIG. 6, a first recording member 60 is drum-shaped, having a cylindrical charge holding layer 62 and an electrode layer 64 extending inward of the charge holding layer 62. An ac power source 66 is connected between the electrode layers 32 and 64. The second recording member 28 can be moved manually in a direction FB. The second recording member 60 can be rotated manually in a direction FC. The ac power source 66 outputs a pulse bias voltage.

The minimal distance between the first recording member 60 and the second recording member 28 is set to a predetermined distance. The intensity of the electric field applied to the photo-modulation layer 30 by the ac power source 66 is set equal to about the threshold level of the photo-modulation layer 30 in the region where the first recording member 60 and the second recording member 28 are closest to each other.

As the second recording member 28 is moved manually, or as the first recording member 60 is rotated manually, the recorded information is transferred from the first recording member 60 to the second recording member 28 in the region where the first recording member 60 and the second recording member 28 are closest to each other.

Embodiment 5

Figure 7:
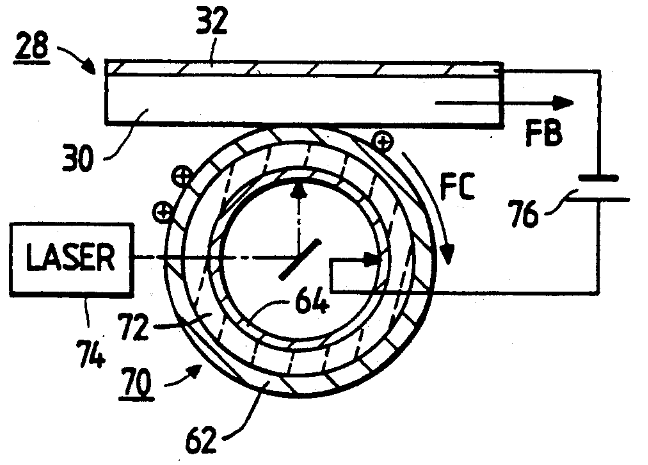
FIG. 7 is a diagram of a charge image information transferring apparatus according to an embodiment of this invention.

FIG. 7 shows an embodiment 5 of this invention which is similar to the embodiment 4 except for the following design changes. As shown in FIG. 7, a first recording member 70 has a photoconductive layer 72 extending between the charge holding layer 62 and the electrode layer 64. In the region where the first recording member 70 and the second recording member 28 are closest to each other, the photoconductive layer 72 is exposed to laser light emitted from a laser device 74. The laser light is applied as a spot of light or a line of light. A dc power source 76 is connected between the electrode layers 32 and 64.

While a bias voltage remains applied between the electrode layers 32 and 64 by the dc power source 76, the laser light is applied to the photoconductive layer 72. The application of the laser light decreases the impedance of the photoconductive layer 72 in the region where the first recording member 70 and the second recording member 28 are closest to each other. The decreased impedance enables a greater electric field to be applied to the photo-modulation layer 30, so that only the part of the photo-modulation layer 30, which extends in the region where the first recording member 70 and the second recording member 28 are closest to each other, is exposed to an electric field greater than the threshold level of the photo-modulation layer 30. As a result, the recorded information is transferred from the first recording medium 70 to the second recording medium 28.

Embodiment 6

Figure 8:
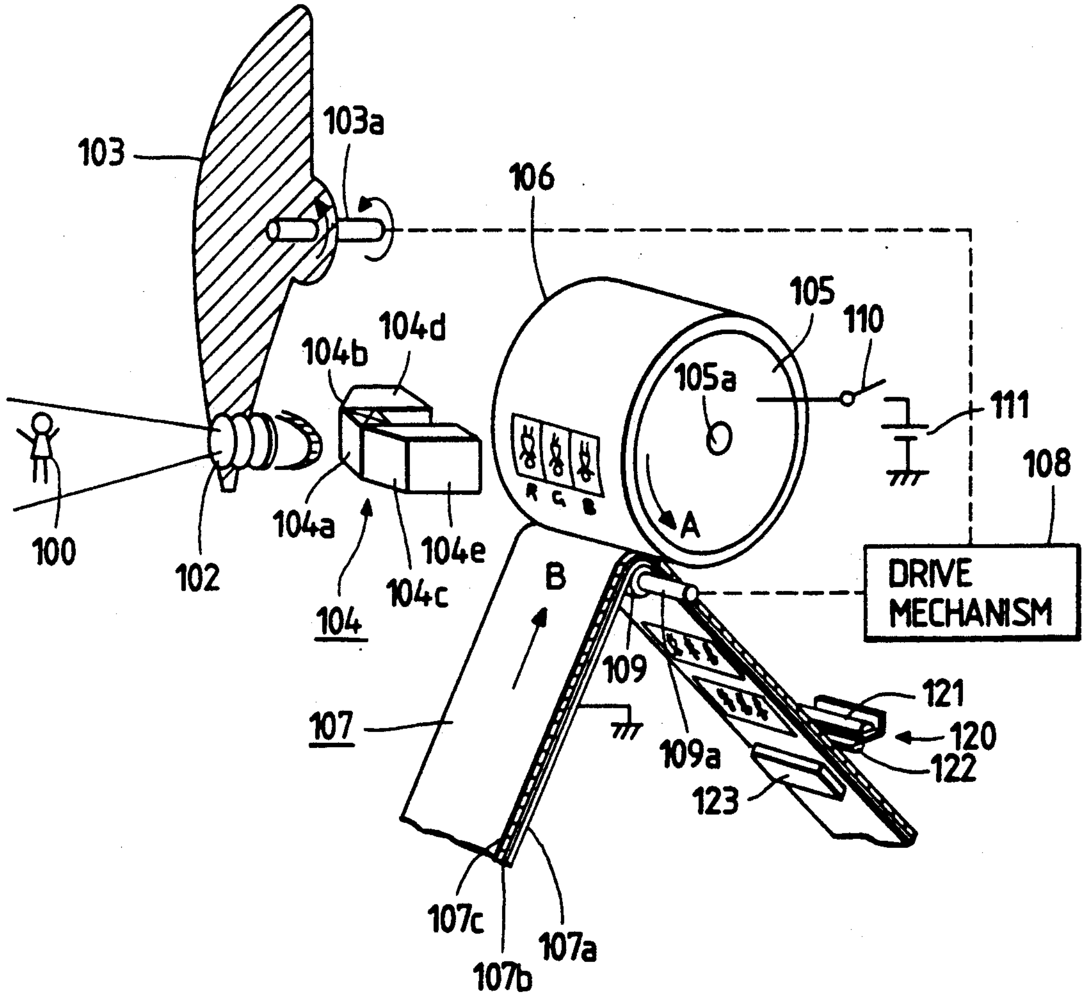
FIG. 8 is a diagram of an image information transferring apparatus according to an embodiment of this invention.

With reference to FIG. 8, a lens set 102, an optical shutter 103, and a color separation optical system 104 are sequentially arranged between an object 100 and a photoconductive member 106. The photoconductive member 106 is made of a layer formed on a drum 105. The lens set 102 is designed so that images of the object 100 will be formed on a curved surface of the photoconductive member 106. The shutter 103 serves to selectively block and transmit light from the object 100 to the photoconductive member 106. The color separation optical system 104 serves to separate light into red light, green light, and blue light.

The shutter 103 is mounted on a shaft 103*a*. The shaft 103*a* is connected to an intermittent drive mechanism 108 via a suitable device (not shown) so that the shutter 103 can be driven intermittently. When the shutter 103 is open, a light beam representing an image of the object 100 is transmitted from the lens set 102 tothe color separation optical system 104. When the shutter 103 is closed, the light beam representing the image of the object 100 is blocked. The light beam which passes through the shutter 103 is separated by the color separation optical system 104 into a red light beam, a green light beam, and a blue light beam. The color separation optical system 104 includes a combination of a dichroic prism 104*a*, total reflection surfaces 104*b* and 104*c*, and light path correcting prisms 104*d* and 104*e*.

Green components of the light beam pass through the dichroic prism 104*a* along a straight path, forming a green image of the object 100 on the photoconductive member 106. Red components of the light beam are transmitted toward the light path correcting prism 104*d* within the dichroic prism 104*a*, being reflected by the total reflection surface 104*b* and advancing in the light path correcting prism 104*d*. Then, the red components of the light beam exit from the light path correcting prism 104*d*, and are focused into a red image of the object 100 on the photoconductive member 106. Blue components of the light beam are transmitted toward the light path correcting prism 104*e* within the dichroic prism 104*a*, being reflected by the the total reflection surface 104*c* and advancing in the light path correcting prism 104*e*. Then, the blue components of the light beam exit from the light path correcting prism 104*e*, and are focused into a blue image of the object 100 on the photoconductive member 106. As shown in FIG. 8, the blue image B, the green image G, and the red image R are sequentially arranged along a shaft 105*a* of the drum 105.

The drum 105 is made of electrically conductive material such as metal. The drum 105 can be rotated about the shaft 105*a* in a direction denoted by the arrow A. The drum 105 is connected to the positive terminal of a dc power source 111 via a switch 110. The negative terminal of the dc power source 111 is grounded. When the switch 110 is closed, the drum 105 is subjected to a voltage from the dc power source 111 so that the information represented by the images on the photoconductive member 106 can be transferred to a recording medium 107 as will be explained later. The dc power source 111 serves to generate an external electric field for recording an electric variation, which results from the formation of the optical images on the photoconductive member 106, on the recording medium 107.

The photoconductive member 106 includes a layer of photoconductive material such as amorphous silicon which is formed on the drum 105. Charges (carriers) are generated within the photoconductive member 106 in correspondence with a variation in the brightness of the light beam, that is, a variation in the intensity of the light beam, and the generated charges (carriers) cause a variation in the conductivity of the photoconductive member 106. After a predetermined time elapses, the formed images on the photoconductive member 106 disappear naturally. In other words, as the time elapses, the charges (carriers) in the photoconductive member 106 disappear naturally.

The recording medium 107 has a lamination of a transparent support layer (a transparent base film) 107*a*, a transparent electrode layer 107*b*, and a recording layer 107*c*. The recording medium 107 includes an elongated film wound on a feeding roll and a winding roll (not shown). The transparent electrode 107*b* is grounded. The recording medium 107 is forced into contact with the photoconductive member 106, so that the recording layer 107*c* and the photoconductive member 106 oppose each other. The recording layer 107*c* is made of photo-modulation material, such as a composite film of a high-molecular material and liquid crystal, or PLZT. The optical characteristics of the photo-modulation material vary in response to the intensity of an applied electric field.

The recording layer 107*c* may be made of charge holding material such as silicone resin or fluororesin. The charge holding material has a function of holding a charge latent image for a long period. The charged potential on the surface of the charge holding layer varies in accordance with a change in the conductivity of the photoconductive member 106 which is caused in response to the brightness of the images on the photoconductive member 106. In this case, the recorded information on the recording layer 107 is represented by a charge latent image.

A feed roller 109 presses the recording medium 107 against the photoconductive member 106 on the drum 105. The feed roller 109 is made of, for example, a rubber. As the feed roller 109 rotates, the recording member 107 is advanced and the drum 105 is rotated. A shaft 109*a* of the feed roller 109 is connected to the intermittent drive mechanism 108 via a suitable device (not shown). The feed roller 109 is driven in synchronism with the drive of the shutter 103. Specifically, as the feed roller 109 is rotated clockwise, the recording medium 107 is advanced in a direction B and the drum 105 is rotated in a counterclockwise direction A.

In operation, when the shutter 103 is opened, color separated images of the object 100 are formed on the photoconductive member 106. On the part of the photoconductive member 106 which is exposed to the formed images, there occurs an amount of charges which depends on the brightness of the formed images. In this way, the information represented by the color separated images of the object 106 is recorded on the photoconductive member 106. After the shutter 103 is closed, the feed roller 109 is rotated clockwise so that the charge-occurring part of the photoconductive member 106 moves through a position in contact with the recording member 107. When the charge-occurring part of the photoconductive member 106 passes through the position in contact with the recording medium 107, the switch 110 is closed and thus an electric field is generated between the drum 105 and the transparent electrode layer 107*b* by the dc power source 111. The generated electric field is applied to the photoconductive member 106 and the recording layer 107*c*. The recording layer 107*c* is also subjected to an electric field caused by the charges on the photoconductive member 106. As a result, the information represented by the color separation images of the object 100 is transferred from the photoconductive member 106 to the recording layer 107*c*.

As the feed roller 109 is further rotated clockwise, the charge-occurring part of the photoconductive member 106 separates from the position in contact with the recording medium 107 so that the information transfer is ended. Then, the rotation of the feed roller 109 is suspended, and the switch 110 is opened again and the shutter 3 is also opened again. As a result, new color separated images of the object 100 are formed on the photoconductive member 106, and the information represented by the new color separated images of the object 106 is recorded on the photoconductive member 106. Then, the information represented by the new color separated images of the object 100 is transferred from the photoconductive member 106 to the recording layer 107*c* in a way similar to the way of the previously-mentioned case. Such processes are reiterated, so that images of the object 100 are periodically sampled and recorded on the photoconductive member 106 and pieces of information which are represented by the sampled images of the object 100 are transferred from the photoconductive member 106 to the recording layer 107*c*. In this way, information representing a series of sampled images of an object such as a moving object is recorded on the recording medium 107.

In the case where the drum 105 is rotated through 360 degrees, the previous charge-occurring part of the photoconductive member 106 returns to the position which is exposed to images of the object 100. The material constituting the photoconductive member 106 and the speed of the rotation of the drum 105 are chosen so that the charges on the photoconductive member 106 will disappear in an interval during which the drum 105 rotates through 360 degrees. Thus, when the previous charge-occurring part of the photoconductive member 106 returns to the position which is exposed to the images of the object 100, the previous charges already disappear so that the new information can be accurately recorded on the photoconductive member 106.

In the case where the recording layer 107*c* is made of the previously-mentioned photo-modulation material, a reproducing device 120 includes a line light source 121 extending along the width of the recording medium 107. A cylindrical lens 122 is located between the line light source 121 and the recording medium 107. A line CCD 123 opposes the cylindrical lens 122 via the recording medium 107. The light beam emitted from the line light source 121 is focused by the cylindrical lens 122 into a line on the recording medium 107. The line light beam passes through the transparent support layer 107*a*, the transparent electrode layer 107*b*, and the recording layer 107*c* of the recording medium 107. The line light beam is modulated in accordance with the information recorded on the recording medium 107, and is then incident to the line CCD 123. The CCD 123 outputs a signal representing the information recorded on the recording medium 107.

Embodiment 7

Figure 9:
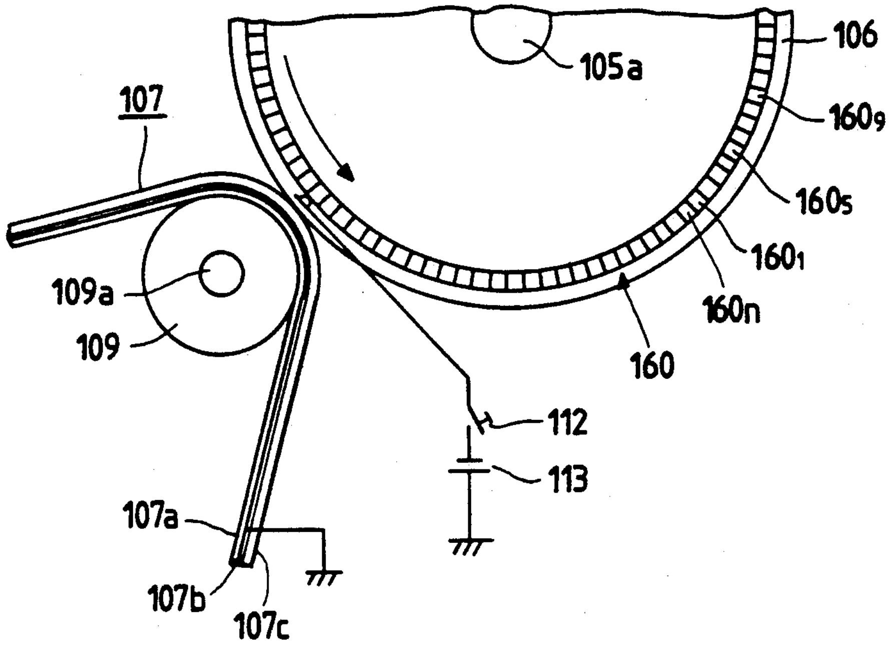
FIG. 9 is a diagram of a part of an image information transferring apparatus according to an embodiment of this invention.

FIG. 9 shows an embodiment 7 of this invention which is similar to the embodiment 6 except for the following design changes. As shown in FIG. 9, a drum 160 has electrically separated electrodes $\mathbf{160}_1$, $\mathbf{160}_2$, . . . $\mathbf{160}_n$, and a photoconductive member 106. The negative terminal of a dc power source 113 is connected to a contact (no reference numeral) via a switch 112. Under conditions where the switch 112 remains closed, as the drum 160 rotates, the negative terminal of the dc power source 113 sequentially contacts with one of the separated electrodes $\mathbf{160}_1$, $\mathbf{160}_2$, . . . $\mathbf{160}_n$ which assumes a position corresponding to the position where the drum 160 and a recording medium 107 are in contact. The positive terminal of the dc power source 113 is grounded. The dc power source 113, the separated electrodes $\mathbf{160}_1$, $\mathbf{160}_2$, . . . $\mathbf{160}_n$, and an electrode layer 107*b* of a recording medium 107 cooperate to apply an electric field to the photoconductive member 106 and a recording layer 107*c* of the recording medium 107. The arrangement of the separated electrodes $\mathbf{160}_1$, $\mathbf{160}_2$, . . . $\mathbf{160}_n$ prevents the electric field from spreading out of the region where the drum 160 and the recording medium 107 are in contact.

Embodiment 8

Figure 10:
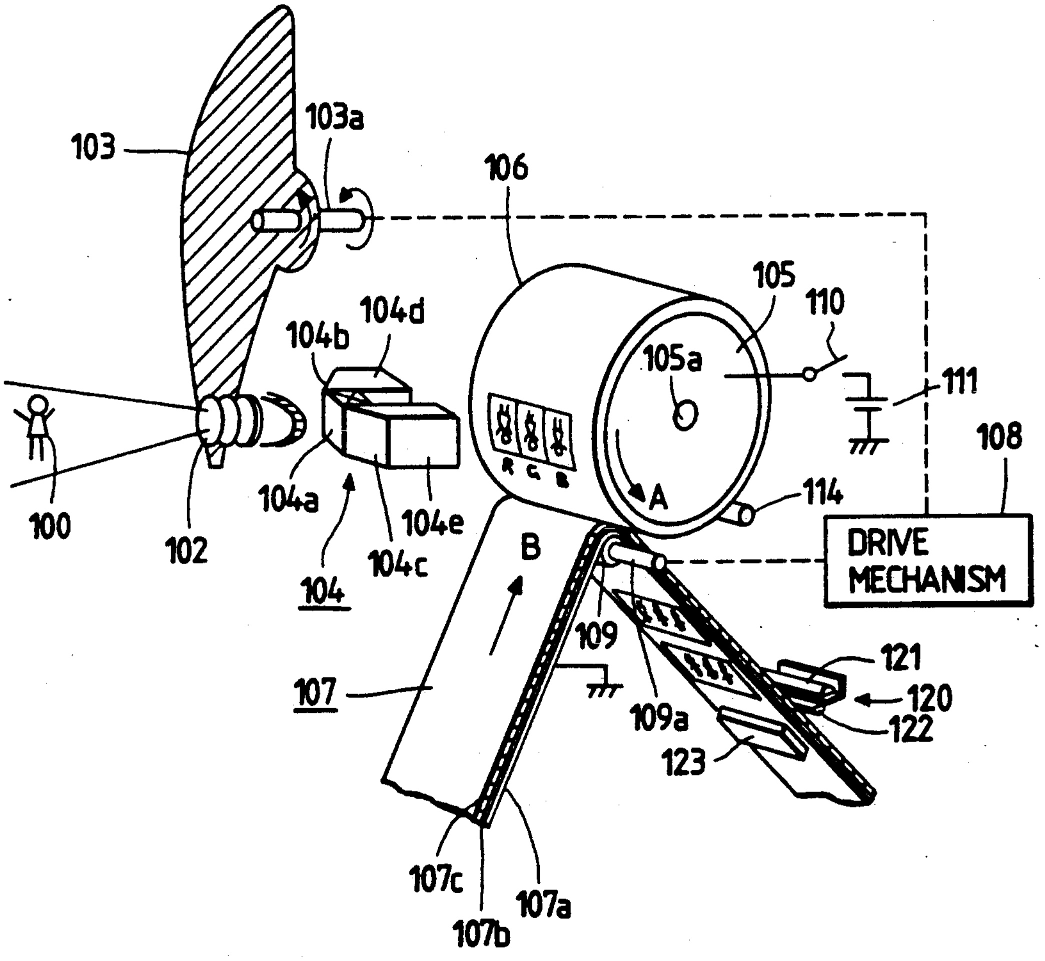
FIG. 10 is a diagram of an image information transferring apparatus according to an embodiment of this invention.

FIG. 10 shows an embodiment 8 of this invention which is similar to the embodiment 6 except for the following additional design. As shown in FIG. 10, a line light source 114 extends along the width of the drum 105. The line light source 114 is driven by a suitable device (not shown). The line light source 114 serves to apply light to the photoconductive member 106 to remove undesirably remaining charges from the photoconductive member 106. It should be noted that the line light source 114 may be replaced by a charge-removing brush engaging the photoconductive member 106.

Embodiment 9

Figure 11:
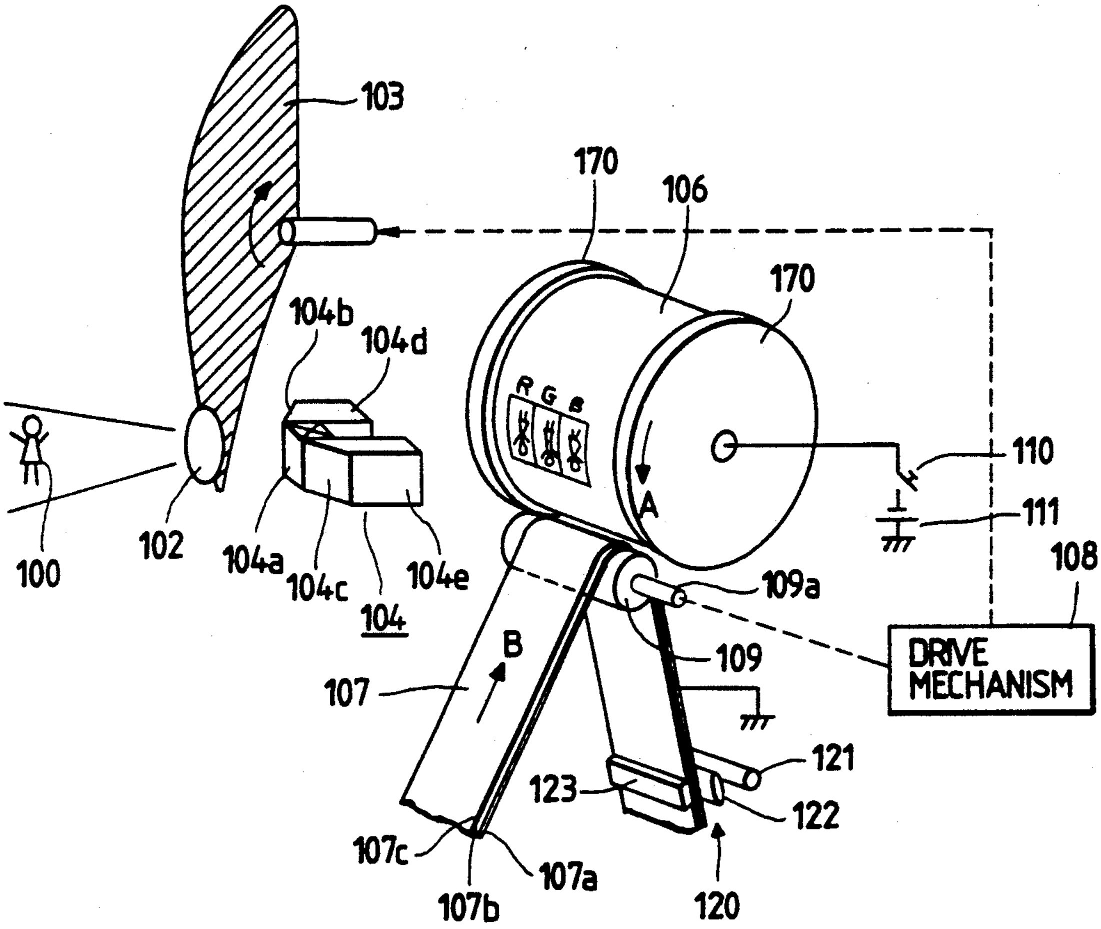
FIG. 11 is a diagram of an image information transferring apparatus according to an embodiment of this invention.

FIG. 11 shows an embodiment 9 of this invention which is similar to the embodiment 6 except for the following design changes. As shown in FIG. 11, feed roller guides 170 are fixed to opposite ends of the drum 105 respectively. The feed roller guides 170 has a diameter greater than the diameter of the drum 105. The feed roller guides 170 contact with the feed roller 109, providing a predetermined narrow gap between the photoconductive member 106 and the recording medium 107 and thereby preventing direct contact between the photoconductive member 106 and the recording medium 107. Thus, it is possible to prevent a deterioration of the recorded information which might be caused by the direct contact between the photoconductive member 106 and the recording medium 107.

Embodiment 10

Figures 12, 12B:
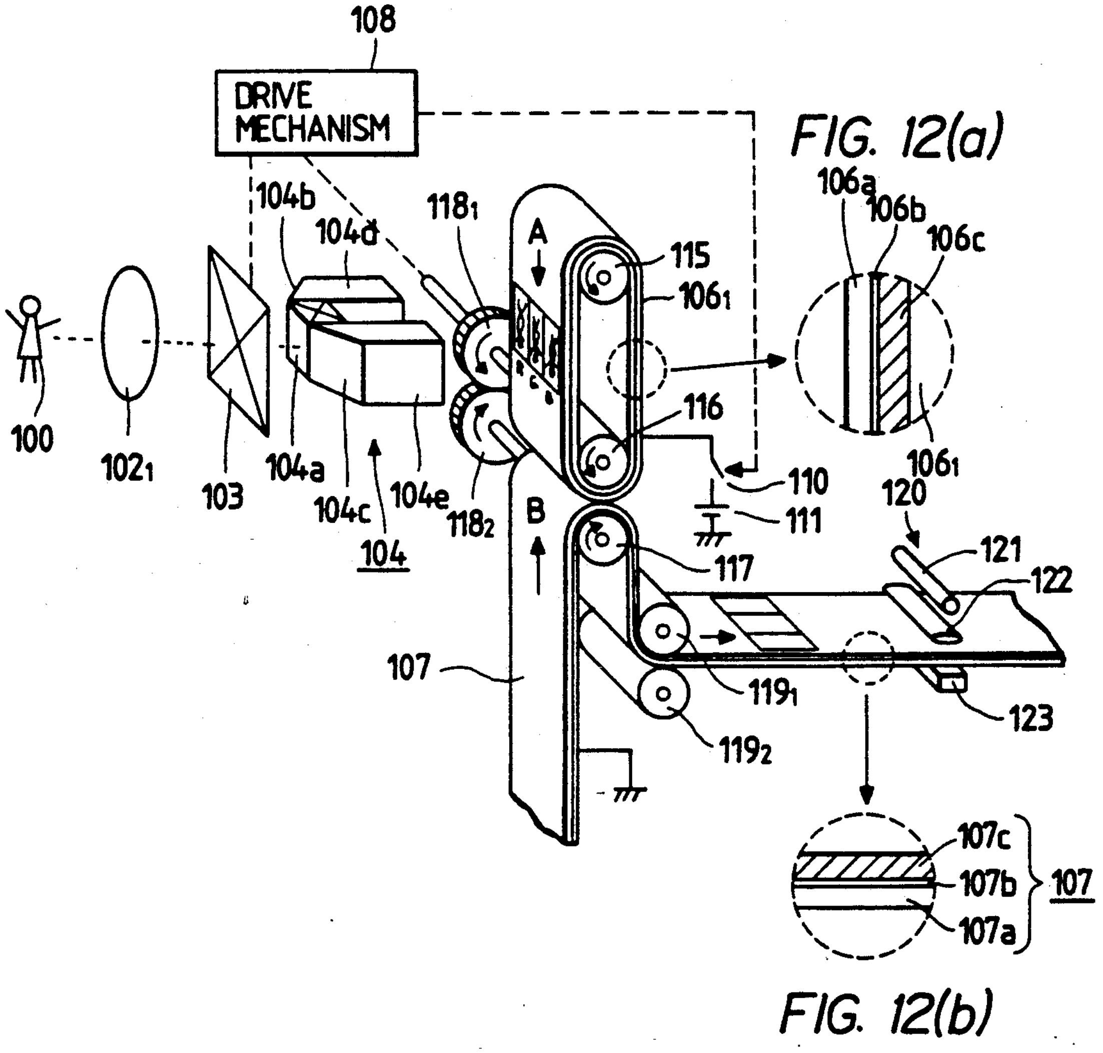

With reference to FIG. 12, a lens $\mathbf{102}_1$, an optical shutter 103, and a color separation optical system 104 are sequentially arranged between an object 100 and a photoconductive member $\mathbf{106}_1$. The photoconductive member $\mathbf{106}_1$ is extended between rollers 115 and 116. The lens $\mathbf{102}_1$ is designed so that images of the object 100 will be formed on a flat surface of the photoconductive member $\mathbf{106}_1$. The shutter 103 serves to selectively block and transmit light from the object 100 to the photoconductive member $\mathbf{106}_1$. The color separation optical system 104 serves to separate light into red light, green light, and blue light. The photoconductive member $\mathbf{106}_1$ has a lamination of a support layer 106*a*, an electrode layer 106*b*, and a photoconductive layer 106*c*.

The shutter 103 is connected to an intermittent drive mechanism 108 via a suitable device (not shown) so that the shutter 103 can be driven intermittently. When the shutter 103 is open, a light beam representing an image of the object 100 is transmitted from the lens $\mathbf{102}_1$ to the color separation optical system 104. When the shutter 103 is closed, the light beam representing the image of the object 100 is blocked. The light beam which passes through the shutter 103 is separated by the color separation optical system 104 into a red light beam, a green light beam, and a blue light beam. The color separation optical system 104 includes a combination of a dichroic prism 104*a*, total reflection surfaces 104*b* and 104*c*, and light path correcting prisms 104*d* and 104*c*.

Green components of the light beam pass through the dichroic prism 104*a* along a straight path, forming a green image of the object 100 on the photoconductive member $\mathbf{106}_1$. Red components of the light beam are transmitted toward the light path correcting prism 104*d* within the dichroic prism 104*a*, being reflected by the the total reflection surface 104*b* and advancing in the light path correcting prism 104*d*. Then, the red components of the light beam exit from the light path correcting prism 104*d*, and are focused into a red image of the object 100 on the photoconductive member $\mathbf{106}_1$. Blue components of the light beam are transmitted toward the light path correcting prism 104*e* within the dichroic prism 104*a*, being reflected by the the total reflection surface 104*c* and advancing in the light path correcting prism 104*e*. Then, the blue components of the light beam exit from the light path correcting prism 104*e*, and are focused into a blue image of the object 100 on the photoconductive member $\mathbf{106}_1$. As shown in FIG. 12, the blue image B, the green image G, and the red image R are sequentially arranged in a direction along the axes of the rollers 115 and 116.

A shaft of the roller 116 is coupled to the intermittent drive mechanism 108 so that the roller 116 can be intermittently rotated by the intermittent drive mechanism 108. As the roller 116 rotates, the photoconductive member $\mathbf{106}_1$ is rotated in a direction denoted by the arrow A while the other roller 115 is also rotated. A gear $\mathbf{118}_1$ is mounted on the shaft of the roller 116.

The electrode layer 106*b* of the photoconductive member $\mathbf{106}_1$ is connected to the positive terminal of a dc power source 111 via a switch 110. The negative terminal of the dc power source 111 is grounded. When the switch 110 is closed, the electrode layer 106*b* is subjected to a voltage from the dc power source 111 so that the information represented by the images on the photoconductive member $\mathbf{106}_1$ can be transferred to a recording medium 107 as will be explained later. The dc power source 111 serves to generate an external electric field for recording an electric variation, which results from the formation of the optical images on the photoconductive member $\mathbf{106}_1$, on the recording medium 107.

Charges (carriers) are generated within the photoconductive member $\mathbf{106}_1$ in correspondence with a variation in the brightness of the light beam, that is, a variation in the intensity of the light beam, and the generated charges (carriers) cause a variation in the conductivity of the photoconductive member $\mathbf{106}_1$. After a predetermined time elapses, the formed images on the photoconductive member $\mathbf{106}_1$ disappear naturally. In other words, as the time elapses, the charges (carriers) in the photoconductive member $106_1$ disappear naturally.

The recording medium 107 has a lamination of a transparent support layer (a transparent base film) 107*a*, a transparent electrode layer 107*b*, and a recording layer 107*c*. The recording medium 107 includes an elongated film wound on a feeding roll and a winding roll (not shown). The transparent electrode 107*b* is grounded. The recording medium 107 is wound on a roller 117 in a predetermined angular range. The roller 117 extends in parallel with the roller 116. A shaft of the roller 117 carries a gear $118_2$ in mesh with the gear $118_1$. Therefore, as the roller 116 rotates, the roller 117 is rotated in an opposite direction while the recording medium 107 advances in a direction B. In the region between the rollers 116 and 117, the photoconductive member $106_1$ and the recording medium 107 oppose each other. The recording medium 107 is passed through a region between rollers $119_1$ and $119_2$, being guided in a predetermined direction.

The information represented by the images on the photoconductive member $106_1$ is transferred to the recording medium 107 as in the embodiment 6.

In the case where the recording layer 107*c* is made of photo-modulation material, a reproducing device 120 includes a line light source 121 extending along the width of the recording medium 107. A cylindrical lens 122 is located between the line light source 121 and the recording medium 107. A line CCD 123 opposes the cylindrical lens 122 via the recording medium 107. The light beam emitted from the line light source 121 is focused by the cylindrical lens 122 into a line on the recording medium 107. The line light beam passes through the transparent support layer 107*a*, the transparent electrode layer 107*b*, and the recording layer 107*c* of the recording medium 107. The line light beam is modulated in accordance with the information recorded on the recording medium 107, and is then incident to the line CCD 123. The CCD 123 outputs a signal representing the information recorded on the recording medium 107.

Embodiment 11

Figure 13:
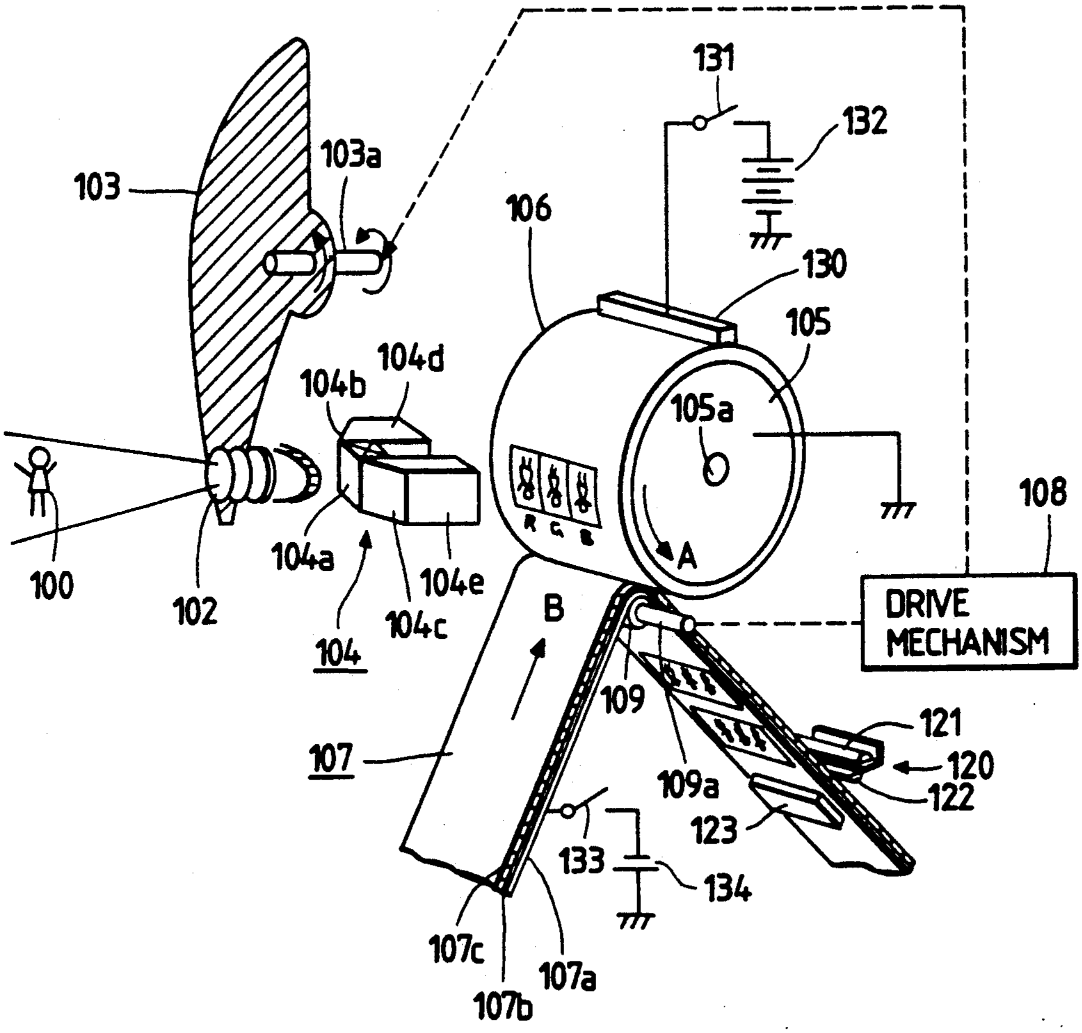
FIG. 13 is a diagram of an image information transferring apparatus according to an embodiment of this invention.

FIG. 13 shows an embodiment 11 of this invention which is similar to the embodiment 6 except for the following design changes. As shown in FIG. 13, a corona charger 130 extends axially and outward of the photoconductive member 106 on the drum 105. The corona charger 130 is connected to the positive terminal of a dc power source 132 via a switch 131. The negative terminal of the dc power source 132 is grounded. The drum 105 is also grounded.

The transparent electrode layer 107*b* of the recording medium 107 is connected to the negative terminal of a dc power source 134. The positive terminal of the dc power source 134 is grounded.

During the rotation of the drum 105, the switch 131 is closed and thus the voltage of the dc power source 132 is applied to the corona charger 130. As a result, the corona charger 130 is activated so that a part of the photoconductive member 106 is uniformly charged to a predetermined potential by the corona charger 130. When the charged part of the photoconductive member 106 advances to a place directly opposing the color separation optical system 104, the feed roller 109 is stopped to suspend the rotation of the drum 105. Then, the optical shutter 103 is opened so that color separated images of the object 100 are formed on the photoconductive member 106. The potential of the photoconductive member 106 is varied in accordance with the brightness of the images on the photoconductive member 106. Thus, the information represented by the images of the object 100 is recorded on the photoconductive member 106 as a variation in the potential on the photoconductive member 106.

After the shutter 103 is closed, the feed roller 109 is rotated so that the information-recorded part of the photoconductive member 106 moves through a position in contact with the recording member 107. When the information-recorded part of the photoconductive member 106 passes through the position in contact with the recording medium 107, the switch 33 is closed and thus an electric field is generated between the drum 105 and the transparent electrode layer 107*b* by the dc power source 134. The generated electric field is applied to the photoconductive member 106 and the recording layer 107*c*. The recording layer 107*c* is also subjected to an electric field which depends on the recorded information on the photoconductive member 106. As a result, the information represented by the color separated images of the object 100 is transferred from the photoconductive member 106 to the recording layer 107*c*.

As the feed roller 109 is further rotated, the information-recorded part of the photoconductive member 106 separates from the position in contact with the recording medium 107 so that the information transfer is ended. Simultaneously, the corona charger 130 is activated. As a result of charging the photoconductive member 106 by the corona charger 130, the previously recorded information is erased from the photoconductive member 106.

Embodiment 12

Figures 14, 14A, 14B:
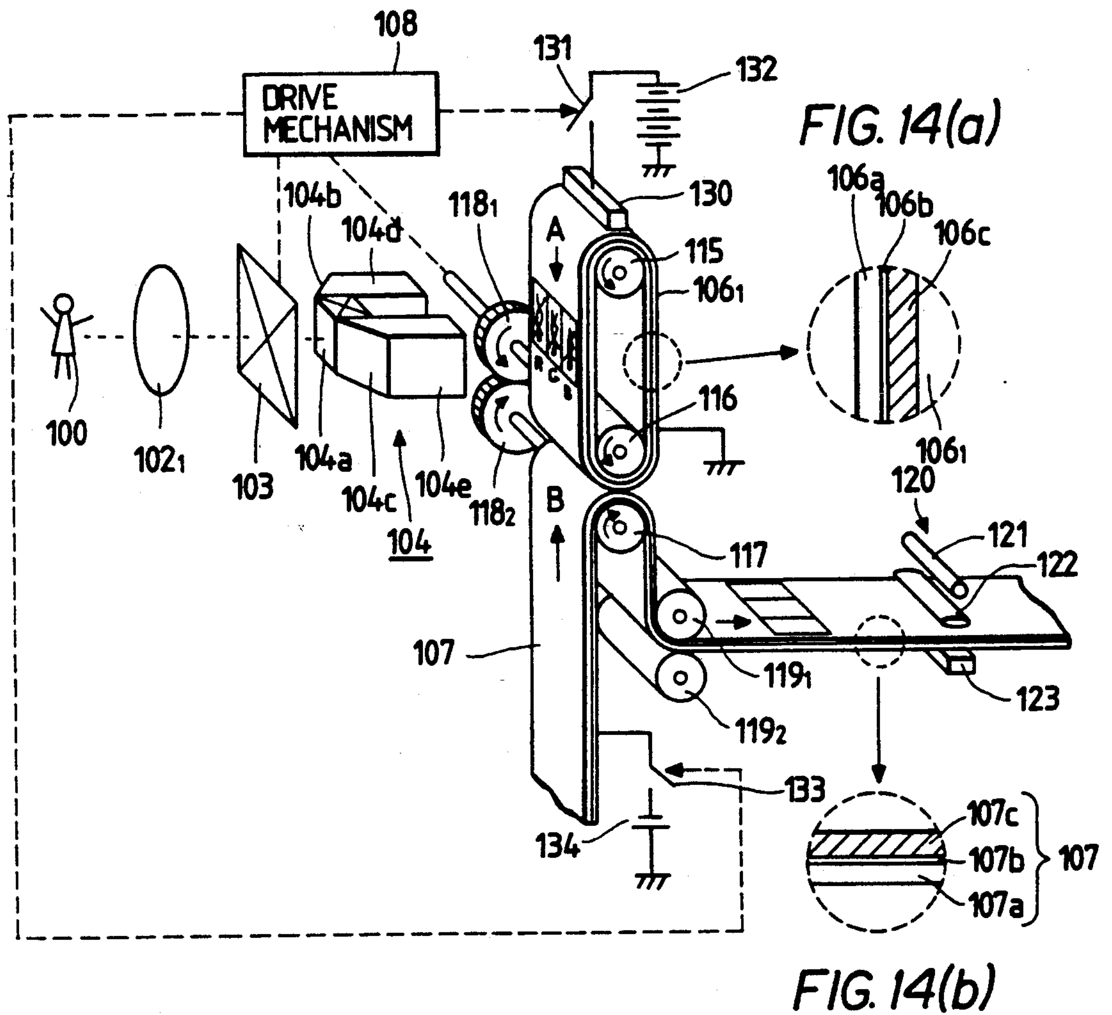
FIGS. 14, 14*a*, & 14*b* are diagrams of an image information transferring apparatus according to an embodiment of this invention.

FIG. 14 shows an embodiment 12 of this invention which is similar to the embodiment 10 except for the following design changes. As shown in FIG. 14, a corona charger 130 extends axially and outward of the photoconductive member $106_1$ on the roller 115. The corona charger 130 is connected to the positive terminal of a dc power source 132 via a switch 131. The negative terminal of the dc power source 132 is grounded. The switch 131 is controlled by the intermittent drive mechanism 108. The electrode layer 106*b* of the photoconductive member $106_1$ is also grounded.

The transparent electrode layer 107*b* of the recording medium 107 is connected to the negative terminal of a dc power source 134 via a switch 133. The positive terminal of the dc power source 134 is grounded. The switch 133 is controlled by the intermittent drive mechanism 108.

During the movement of the photoconductive member $106_1$, the switch 131 is closed and thus the voltage of the dc power source 132 is applied to the corona charger 130. As a result, the corona charger 130 is activated so that a part of the photoconductive member $106_1$ is uniformly charged to a predetermined potential by the corona charger 130. When the charged part of the photoconductive member $106_1$ advances to a place directly opposing the color separation optical system 104, the photoconductive member $106_1$ is stopped. Then, the optical shutter 103 is opened so that color separated images of the object 100 are formed on the photoconductive member $106_1$. The potential of the photoconductive member $106_1$ is varied in accordance with the brightness of the images on the photoconductive member $106_1$. Thus, the information represented by the images of the object 100 is recorded on the photoconductive member $106_1$ as a variation in the potential on the photoconductive member $106_1$.

After the shutter 103 is closed, the photoconductive member $106_1$ is moved again so that the information-recorded part of the photoconductive member $106_1$ passes through a position directly opposing the recording member 107. When the information-recorded part of the photoconductive member $106_1$ passes through the position directly opposing the recording medium 107, the switch 133 is closed and thus an electric field is generated between the electrode layer 106*b* of the photoconductive member $106_1$ and the transparent electrode layer 107*b* of the recording medium 107 by the dc power source 134. The generated electric field is applied to the photoconductive member $106_1$ and the recording layer 107*c*. The recording layer 107*c* is also subjected to an electric field which depends on the recorded information on the photoconductive member $106_1$. As a result, the information represented by the color separated images of the object 100 is transferred from the photoconductive member $106_1$ to the recording layer 107*c*.

As the photoconductive member $106_1$ is further moved, the information-recorded part of the photoconductive member $106_1$ separates from the position directly opposing the recording medium 107 so that the information transfer is ended. Simultaneously, the corona charger 130 is activated. As a result of charging the photoconductive member $106_1$ by the corona charger 130, the previously recorded information is erased from the photoconductive member $106_1$.

Embodiment 13

Figure 15:
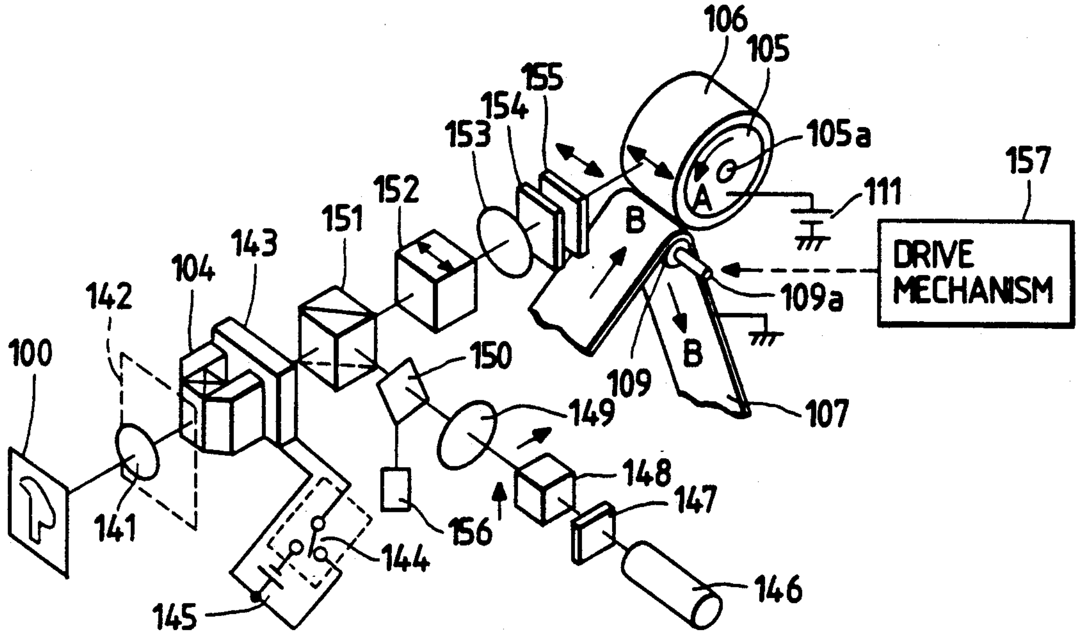
FIG. 15 is a diagram of an image information transferring apparatus according to an embodiment of this invention.

With reference to FIG. 15, color separated images of an object 100 are formed on a photo-photo conversion element (a light-light conversion element) 143 via a lens 141, a shutter 142, and a color separation optical system 104.

Figure 16:
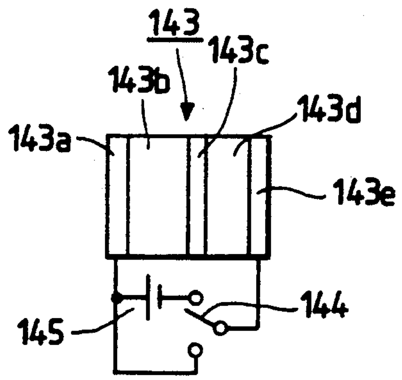
FIG. 16 is a diagram of the photo-photo conversion element of FIG. 15.

As shown in FIG. 16, the photo-photo conversion element 143 has a lamination of a transparent electrode 143*a*, a photoconductive layer 143*b*, a dielectric mirror 143*c*, a photo-modulation layer 143*d*, and a transparent electrode 143*e*. The positive terminal of a dc power source 145 is connected to the electrode 143*a*. The negative terminal of the dc power source 145 is connected to a first fixed contact of a switch 144. A second fixed contact of the switch 144 is directly connected to the electrode 143*a*. A movable contact of the switch 144 is connected to the electrode 143*e*.

The information represented by the images on the photo-photo conversion element 143 is read out as follows. A light beam emitted from a light source 146 passes through a polarizer 147, an optical deflector 148, a collimator lens 149, and a beam splitter 150, and then the light beam is incident to a semitransparent prism 151. For example, the light source 146 is composed of a laser device. The optical deflector 148 serves to deflect the light beam vertically and horizontally.

The direction of the travel of the light beam is changed by the semitransparent prism 151, so that the light beam is incident to the transparent electrode 143*e* of the photo-photo conversion element 143. The light beam passes through the transparent electrode 143*e* and the photo-modulation layer 143*d*, reaching the dielectric mirror 143*c* and being reflected by the dielectric mirror 143*c*. Then, the light beam travels back through the photo-modulation layer 143*d* and the transparent electrode 143*e*. Since the images are formed on the photoconductive layer 143*b* as described previously, charges are generated at the boundary between the photoconductive layer 143*b* and the dielectric mirror 143*c* in correspondence with the images. Thus, under conditions where the switch 144 remains in a position at which the dc power source 145 is connected between the electrodes 143*a* and 143*e* so that an electric field is generated in the photo-photo conversion element 143, the light beam is modulated in accordance with the images and thus the information represented by the images is read out from the photo-photo conversion element 143 by the light beam.

The light beam outputted from the photo-photo conversion element 143 passes through the semitransparent prism 151, being incident to an optical deflector 152 and being deflected horizontally by the optical deflector 152. After the light beam exits from the optical deflector 152, the light beam passes through a lens 153, a wave plate 154, and an analyzer 155. A light source 156 is used for an erasing process.

The light beam outputted from the analyzer 155 is applied to a photoconductive member 106 formed on a metal drum 105. Conditions of the photoconductive member 106 are varied in accordance with the light beam so that the information represented by the light beam is recorded on the photoconductive member 106.

The positive terminal of a dc power source 111 is connected to the drum 105. The negative terminal of the dc power source 111 is grounded. A recording medium 107 is pressed against the photoconductive member 106 by a feed roller 109. An electrode within the recording medium 107 is grounded. A shaft 109*a* of the feed roller 109 is coupled to a drive mechanism 157 so that the feed roller 109 is driven by the drive mechanism 147. The recorded information is transferred from the photoconductive member 106 to the recording medium 107 in a manner basically similar to the manner of the information transfer in the embodiment 6.

What is claimed is:

1. A charge image information transferring apparatus comprising a recording member having a charge latent image; a photo-modulation member; means for moving the recording member and the photo-modulation member relative to each other; and means for transferring information, represented by the charge latent image, from the recording member to the photo-modulation member:

the improvement comprising means for applying an electric field of the charge latent image to the photo-modulation member when a distance between the recording member and the photo-modulation member becomes equal to or smaller than a predetermined distance, the applied electric field having a magnitude which exceeds a threshold value with respect to a change in a condition of the photo-modulation member.

2. A method of using a charge image information transferring apparatus for applying light to a photoconductive member to record information on a recording member comprising the steps of:

applying light to a part of the photoconductive member at a first position, and recording information represented by the light on the part of the photoconductive member;

opposing the recording member to a second position on the photoconductive member, the second position differing from the first position:

moving the information-recorded part of the photoconductive member to the second position; and providing an electrical change to the recording member in response to the information recorded on the photoconductive member, and transferring the information from the photoconductive member to the recording member.

3. An apparatus comprising:

a photoconductive member;

a recording member;

means for applying light to a part of the photoconductive member at a first position, and for recording information represented by the light on the part of the photoconductive member;

means for opposing the recording member to a second position on the photoconductive member, the second position differing from the first position;

means for moving the information-recorded part of the photoconductive member to the second position; and means for providing an electrical change to the recording member in response to the information recorded on the photoconductive member, and for transferring the information from the photoconductive member to the recording member.

4. The apparatus of claim 3 further comprising a drum supporting the photoconductive member.

5. The apparatus of claim 4 wherein the drum includes electrically-separated electrodes.

6. The apparatus of claim 3 further comprising a belt supporting the photoconductive member.

7. The apparatus of claim 3 wherein the recording member and the photoconductive member are spaced from each other by a predetermined gap at the second position.

* * * * *

UNITED STATES PATENT AND TRADEMARK OFFICE

CERTIFICATE OF CORRECTION

PATENT NO. : 5,237,345

DATED : August 17, 1993

INVENTOR(S) : Itsuo TAKANASHI et al

It is certified that error appears in the above-indentified patent and that said Letters Patent is hereby corrected as shown below:

On the title page, the inventors' names should read as follows:

[75] Inventors: Itsuo Takanashi, Kamakura; Shintaro Nakagaki, Miura; Tsutou Asakura; Masato Furuya, both of Yokohama; Yoshihisa Koyama, Yokosuka; Yuji Uchiyama, Chigasaki, all of Japan The Foreign Application Priority Data should read as follows:

[30] Foreign Application Priority Data

| | | | |
|---|---|---|---|
| Jun. 22, 1990 | [JP] | Japan ............. | 2-165351 |
| Jul. 6, 1990 | [JP] | Japan ............. | 2-179178 |
| Mar. 28, 1991 | [JP] | Japan ............. | 3-89977 |

Signed and Sealed this

Twenty-second Day of March, 1994

*Attest:*

BRUCE LEHMAN

*Attesting Officer*

*Commissioner of Patents and Trademarks*